US011737173B2

(12) United States Patent
Trojer et al.

(10) Patent No.: US 11,737,173 B2
(45) Date of Patent: *Aug. 22, 2023

(54) METHODS, INTERMEDIATE RADIO UNITS AND RADIO HEADS OF BASE STATION SYSTEMS FOR TRANSMISSION OF ANTENNA CARRIERS

(71) Applicant: Telefonaktiebolaget LM Ericsson (publ), Stockholm (SE)

(72) Inventors: Elmar Trojer, Täby (SE); Miguel Berg, Sollentuna (SE); Per-Erik Eriksson, Stockholm (SE); Aldebaro Klautau, Marco-Belem-Para (BR); Chenguang Lu, Sollentuna (SE); Leonardo Ramalho, Marambaia-Belem-Para (BR); Marcos Takeda, Icui-Ananindeua-Para (BR)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/845,334

(22) Filed: Jun. 21, 2022

(65) Prior Publication Data
US 2022/0394817 A1  Dec. 8, 2022

Related U.S. Application Data

(63) Continuation of application No. 16/642,697, filed as application No. PCT/SE2017/050866 on Aug. 31, 2017, now Pat. No. 11,382,173.

(51) Int. Cl.
*H04W 88/08* (2009.01)
*H04B 7/04* (2017.01)
(Continued)

(52) U.S. Cl.
CPC ............ *H04W 88/085* (2013.01); *H04B 7/04* (2013.01); *H04B 10/25753* (2013.01);
(Continued)

(58) Field of Classification Search
CPC ............... H04W 88/085; H04W 24/02; H04W 72/0453; H04W 92/12; H04W 92/04;
(Continued)

(56) References Cited

U.S. PATENT DOCUMENTS

| 11,382,173 B2 * | 7/2022 | Trojer ............... H04W 72/0453 |
| 2009/0290632 A1 * | 11/2009 | Wegener ............... H03M 7/30 |
| | | 375/240 |

(Continued)

FOREIGN PATENT DOCUMENTS

| EP | 3257165 | 12/2018 |
| WO | 2016/128045 | 8/2016 |
| WO | 2017/061915 | 4/2017 |

OTHER PUBLICATIONS

"Fronthaul Signal Compression in C-RAN with Carrier Aggregation"; Takeda et al.; XXXVI SIMPO' Sio Brasileiro De Telecomunicac,O~ Es E Processamento De Sinais—SBrT2018, Sep. 16-19, 2018, Campina Grande, PB (Year: 2018).*

(Continued)

*Primary Examiner* — Benjamin H Elliott, IV
(74) *Attorney, Agent, or Firm* — Rothwell, Figg, Ernst & Manbeck, P.C.

(57) ABSTRACT

A method performed by an IRU of a base station system, the base station system comprising the IRU, a BBU connected to the IRU, and a first RH connected to the IRU via a packet data network. The first RH is arranged for wireless transmission in RF of a plurality of antenna carriers to UEs. The method comprises receiving, from the BBU, a plurality of first digital representations of the plurality of antenna car-
(Continued)

riers of the first RH, each first digital representation representing one antenna carrier, the plurality of first digital representations being received in a baseband frequency range, frequency multiplexing the plurality of first digital representations of the plurality of antenna carriers into a second digital representation over a first bandwidth, and transmitting the second digital representation to the first RH.

19 Claims, 8 Drawing Sheets

(51) Int. Cl.
*H04B 10/2575* (2013.01)
*H04W 24/02* (2009.01)
*H04W 72/0453* (2023.01)
*H04W 92/12* (2009.01)

(52) U.S. Cl.
CPC ....... *H04W 24/02* (2013.01); *H04W 72/0453* (2013.01); *H04W 92/12* (2013.01)

(58) Field of Classification Search
CPC ...... H04B 1/40; H04B 10/25753; H04B 7/04; H04B 7/08; H04B 7/0802; H04B 7/06; H04B 7/0602; H04B 7/022
See application file for complete search history.

(56) References Cited

U.S. PATENT DOCUMENTS

| | | | | |
|---|---|---|---|---|
| 2010/0283861 A1* | 11/2010 | Tamagawa | ............. | H04N 1/603 348/E5.022 |
| 2012/0195351 A1* | 8/2012 | Banwell | ................. | H04B 1/525 375/219 |
| 2013/0259165 A1* | 10/2013 | Boehlke | ............. | H04L 27/2647 375/340 |
| 2014/0355991 A1* | 12/2014 | Cameirao | .......... | H04B 10/2575 398/79 |
| 2015/0055593 A1* | 2/2015 | Lemson | ................... | H04B 1/18 370/329 |
| 2015/0092880 A1* | 4/2015 | Johansson | ............. | H03F 1/3241 375/295 |
| 2015/0092890 A1* | 4/2015 | Richards | ................. | H04L 27/22 375/329 |
| 2015/0146806 A1* | 5/2015 | Terry | .................. | H04L 27/2607 375/260 |
| 2015/0296344 A1* | 10/2015 | Trojer | ................... | H04W 4/027 455/456.1 |
| 2016/0056874 A1* | 2/2016 | Wala | .................... | H04B 7/0697 375/267 |
| 2016/0183248 A1* | 6/2016 | Niu | ..................... | H04L 27/2626 370/329 |
| 2016/0227549 A1* | 8/2016 | Shako | ............... | H04W 52/0261 |
| 2016/0249370 A1* | 8/2016 | Lu | ......................... | H04W 16/10 |
| 2017/0324454 A1* | 11/2017 | Merkel | ................ | H04B 7/0617 |
| 2017/0353214 A1* | 12/2017 | Lins de Medeiros | ....................... | H04L 25/03343 |
| 2017/0373890 A1* | 12/2017 | Fertonani | ................ | H04L 27/26 |
| 2018/0255546 A1* | 9/2018 | Luo | ..................... | H04W 88/085 |
| 2018/0278452 A1* | 9/2018 | Yang | ....................... | H04B 1/0071 |
| 2018/0295674 A1* | 10/2018 | Chen | ................... | H04W 28/085 |
| 2018/0323813 A1* | 11/2018 | Kim | .......................... | H03F 3/68 |
| 2018/0366815 A1* | 12/2018 | Rheinfelder | ......... | H01Q 3/2605 |
| 2019/0089428 A1* | 3/2019 | Bethanabhotla | ..... | H04B 7/0608 |
| 2019/0140683 A1* | 5/2019 | Papa | ....................... | H04B 1/40 |
| 2020/0137694 A1* | 4/2020 | Stapleton | .............. | H04W 40/02 |
| 2020/0205231 A1* | 6/2020 | Trojer | ...................... | H04B 1/40 |

OTHER PUBLICATIONS

Ramalho, "An LPC-Based Fronthaul Compression Scheme"; IEEE Communications Letters, vol. 21, No. 2, Feb. 2017.
"Design of Flexible Radio Unit for Distributed Antenna Systems"; 2014 International Conference on Advanced Technologies for Communications; Oh et al. (Year: 2014).
Liu, "Efficient Mobile Fronthaul via DSP-Based Channel Aggregation"; Journal of Lightwave Technology, vol. 34, No. 6, Mar. 15, 2016.
"Improved LPC-Based Fronthaul Compression With High Rate Adaptation Resolution"; IEEE Communications Letters, vol. 22, No. 3, Mar. 2018.
Guo, "LTE/LTE—A Signal Compression on the CPRI Interface"; Bell Labs Technical Journal 18(2), pp. 117-133, Aug. 28, 2013.
International Search Report and Written Opinion dated May 11, 2018 issued in International application No. PCT/SE2017/050866. (10 pages).
3GPP TR 38.801 V2.0.0 (Mar. 2017); 3rd Generation Partnership Project; Technical Specification Group Radio Access Network; Study on New Radio Access Technology; Radio Access Architecture and Interfaces (Release 14) (Mar. 2017). (90 pages).
Westerberg, E., "4G/5G RAN Architecture: How a Split Can Make the Difference", Ericsson Technology Review, Charting the Future of Innovation, vol. 93, No. 6 (Jul. 2016). (16 pages).
Laraqui, K., et al., "5G and Fixed Wireless Access", Ericsson Technology Review, Charting the Future of Innovation, vol. 93, No. 10 (Dec. 2016). (16 pages).
CPRI Specification V7.0 (Oct. 9, 2015); Common Public Radio Interface (CPRI); Interface Specification. (128 pages).

* cited by examiner

METHODS, INTERMEDIATE RADIO UNITS AND RADIO HEADS OF BASE STATION SYSTEMS FOR TRANSMISSION OF ANTENNA CARRIERS

CROSS-REFERENCE TO RELATED APPLICATIONS

This application is a continuation of U.S. application Ser. No. 16/642,697, filed on Feb. 27, 2020 (status pending), which is the National Stage application of International Patent Application No. PCT/SE2017/050866, filed Aug. 31, 2017. The above identified applications are incorporated by reference.

TECHNICAL FIELD

The present disclosure relates generally to methods, intermediate radio units and radio heads of base station systems of wireless communication systems for transmission of antenna carriers.

BACKGROUND

There are today different concepts for distributing base station functionality onto different nodes into a distributed base station system. Basic purposes for distributing base station functionality are to improve radio coverage and to increase throughput to User Equipments, UEs, also called mobile stations. In a distributed base station system, base station functionality is typically distributed onto a base band unit, BBU and a plurality of remote radio units, RRU, connected to the BBU.

A first prior art distributed base station systems is shown in FIG. 1a. The base station, e.g. a 3G/4G eNodeB is split into a baseband unit, BBU 110 and a number of radio units, RU, 130 connected to the BBU 110. The BBU 110 is further connected to other nodes of a wireless communication network 100 via S1-interfaces connecting to the core network and/or X2-interfaces, connecting to other base stations. A Common Public Radio Interface, CPRI, is used to fronthaul digital antenna carriers, AxC, synchronization, and O&M data downlink and uplink to the radio units, RU, 130. CPRI is specified in CPRI Specification V7.0, dated Oct. 9, 2015. The RUs 130 provide digital front-end, DFE, functions and analog front end, AFE, functions for handling the digital antenna carriers and O&M data received from the BBU 110. The DFE comprises CPRI processing, Digital Pre-Distortion, (DPD), mixing, Crest Factor Reduction, (CFR), channel and carrier filtering etc. The AFE comprises Digital to Analog/Analog to Digital Conversion, (DAC/ADC), Power Amplification, (PA), Low Noise Amplification, (LNA), filtering, duplexing, antenna interfaces etc. In-between the BBU 110 and the RUs 130 there may be a CPRI cross multiplexing unit, CPRI Mux, 120 to multiplex and demultiplex antenna carriers between CPRI links of the BBU and CPRI links of the RUs. CPRI is a point-to-point link protocol using dedicated transmitter/receiver fibers per BBU-RU connection and specified for different link rates. This prior art base station system relies on direct connections between the BBU and the RU. However, there is an interest and need to use a common packet data network for communication between the BBU and the RU, in order to better utilize communication resources. Further, the RUs need to be rather complex in order to handle the DFE and AFE functions mentioned above. A complex RU means a rather expensive RU. Also, there has to be one DFE for each antenna carrier.

A second prior art distributed base station system is shown in FIG. 1b. This system differs from the system of FIG. 1a in that an Ethernet-based network, i.e. a packet data network is used for the communication between the BBU and the RU. The Ethernet-based network may also be e.g. a passive optical network (PON), Digital Subscriber Line (DSL) network, or an optical transport network (OTN). Data sent over the CPRI protocol is encapsulated in Layer 2 Ethernet frames and transmitted over an 802.1 Ethernet network. This technology is proprietary and called Radio over Ethernet, RoE. Within the Ethernet network, between the BBU 110 and the RU 130, hub nodes 140 are placed, acting as packet switches. Typically, any antenna carrier, AxC, is transmitted in its own packet flow together with 1588 synchronization data and out-of-band O&M data such as Configuration and Fault Management data. DFE and AFE functions are handled in the RU 130. However, the RUs are still rather complex and there has to be one DFE handling each antenna carrier.

A third prior art distributed base station system is shown in FIG. 1c. In this system, remote active radio heads, RH 160 are connected to an Intermediate Radio Unit, IRU 150 via analog point to point interfaces such as copper cables or fiber cables. Such a system makes it possible to cover an area such as a floor in a building with radio coverage and capacity, and if there are already existing copper cables in the building they can be reused. The BBU 110 sends the antenna carriers in baseband over CPRI to the IRU 150 and the IRU converts the antenna carriers into a low intermediate frequency, IF, and performs digital to analog conversion. The analog IF antenna carriers are then distributed onto the cable that leads to the correct RH 160. The RH 160 frequency shifts the antenna carriers to RF for wireless transmission via its antenna(s) to UEs. Due to the low complexity of the RH, the RH can be made cost-efficient and power-efficient compared to the systems of FIGS. 1a and 1b. However, in the system of FIG. 1c a packet data network cannot be used as connection between the RH and the IRU.

US patent application US2009/290632 describes a signal compression method for a base transceiver system that provides efficient transfer of compressed signal samples over serial data links in the system. International patent application WO2016/128045 describes a method for mitigating crosstalk in a base station system comprising a BBU, an IRU and a plurality of RHs. International patent application WO2017/061915 describes a method for controlling uplink contribution from a plurality of remote RHs in a combiner.

Consequently, it is a need of a base station system that can utilize a packet data network for communication with the RHs/RUs and that at the same time can use a cost-efficient RH/RU.

SUMMARY

It is an object of the invention to address at least some of the problems and issues outlined above. It is an object of embodiments of the invention to provide a cost-efficient and reliable base station system that utilizes a packet data network for communication with the radio heads. It is another object to reduce complexity of RH/RUs when transmitting digital data between baseband unit and radio units of a base station system. It may be possible to achieve these objects and others by using methods, intermediate radio units, radio heads and computer programs as defined in the attached independent claims.

According to one aspect, a method is provided performed by an IRU of a base station system. The base station system comprises the IRU, a BBU connected to the IRU, and a first RH connected to the IRU via a packet data network. The first RH is arranged for wireless transmission in radio frequency, RF, of a plurality of antenna carriers to UEs, the plurality of antenna carriers being transmitted from the first RH at individually different RFs. The method comprises receiving, from the BBU, a plurality of first digital representations of the plurality of antenna carriers of the first RH, each first digital representation representing one antenna carrier, the plurality of first digital representations being received in a baseband frequency range. The method further comprises frequency multiplexing the plurality of first digital representations of the plurality of antenna carriers into a second digital representation over a first bandwidth, and transmitting the second digital representation to the first RH.

According to another aspect, a method is provided performed by an RH of a base station system, the RH being arranged for wireless transmission in RF of a plurality of antenna carriers to UEs. The plurality of antenna carriers are to be transmitted from the RH at individually different RFs. The base station system comprises the RH, an IRU connected to the RH via a packet data network, and a BBU connected to the IRU. The method comprises receiving, from the IRU, a second digital representation in a first bandwidth, the second digital representation comprising a plurality of first digital representations of the plurality of antenna carriers, each first digital representation representing one antenna carrier, the plurality of first digital representations of the plurality of antenna carriers being frequency multiplexed into the second digital representation across the first bandwidth. The method further comprises frequency converting the second digital representation into radio frequency, and wirelessly transmitting the converted second digital representation to the UEs.

According to another aspect, an IRU is provided operable in a base station system. The base station system comprises the IRU, a BBU connected to the IRU, and a first RH connected to the IRU via a packet data network. The first RH is arranged for wireless transmission in RF of a plurality of antenna carriers to UEs. The plurality of antenna carriers are to be transmitted from the first RH at individually different RFs. The IRU comprises a processor and a memory. The memory contains instructions executable by said processor, whereby the IRU is operative for receiving, from the BBU, a plurality of first digital representations of the plurality of antenna carriers of the first RH, each first digital representation representing one antenna carrier, the plurality of first digital representations being received in a baseband frequency range. The IRU is further operative for frequency multiplexing the plurality of first digital representations of the plurality of antenna carriers into a second digital representation over a first bandwidth, and transmitting the second digital representation to the first RH.

According to another aspect, an RH is provided operable in a base station system. The RH is arranged for wireless transmission in RF of a plurality of antenna carriers to UEs. The plurality of antenna carriers are to be transmitted from the RH at individually different RFs. The base station system comprises the RH, an IRU connected to the RH via a packet data network, and a BBU connected to the IRU. The RH comprises a processor and a memory. The memory contains instructions executable by said processor, whereby the RH is operative for receiving, from the IRU, a second digital representation in a first bandwidth, the second digital representation comprising a plurality of first digital representations of the plurality of antenna carriers, each first digital representation representing one antenna carrier, the plurality of first digital representations of the plurality of antenna carriers being frequency multiplexed into the second digital representation across the first bandwidth. The RH is further operative for frequency converting the second digital representation into radio frequency, and for wirelessly transmitting the converted second digital representation to the UEs.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a cost-efficient and communication-resource efficient base station system is provided. The base stations system comprises a base band unit, BBU, an intermediate radio unit, IRU, and a number of radio heads, RH. The BBU provides first digital representations of a plurality of antenna carriers of one RH to the IRU. The IRU frequency multiplexes the first digital representations into one second digital representation, wherein the first digital representations are distributed over a first bandwidth. The first bandwidth may be an instantaneous bandwidth, IBW. The IRU can perform DFE functionality on the common second digital representation hereby only needing one DFE functionality for all antenna carriers of one RH, alternatively for one antenna of one RH if the RH has more than one separate antenna. By letting the IRU perform the DFE functionality instead of the RHs, the RHs can be made more cost-efficient. As there are still digital data transmitted from the IRU to the RH, a packet data network can be used for connecting the IRU with the RHs.

Figure 2:
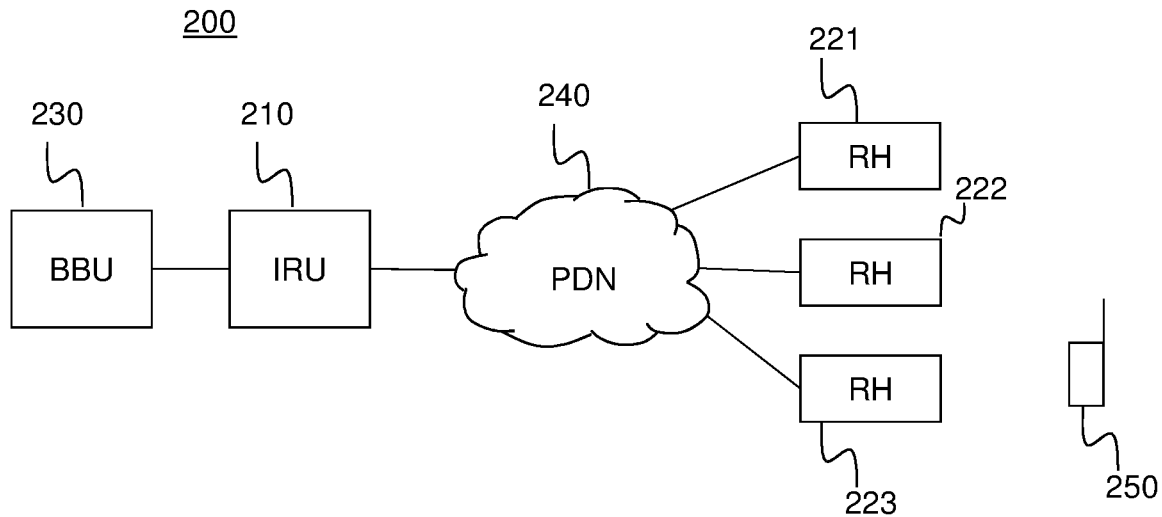
FIG. 2 is a distributed base station system according to embodiments of the invention.

FIG. 2 shows an embodiment of a base station system 200 in which the present invention can be used. The base station system 200 comprises an IRU 210, a BBU 230 connected to the IRU 210 via wireline. The base station system of FIG. 2 further comprises a first RH 221, a second RH 222 and a third RH 223 connected to the IRU 210 via a packet data network 240. The first, second a third RHs are arranged for wireless transmission in radio frequency, RF, of a plurality of antenna carriers to user equipments, UEs 250. In FIG. 2, the IRU 210 has been shown as a node separate from the BBU 230. However, the IRU 210 might as well be an integral part of the BBU node 230 as well being a separate node. The packet data network may be for example a Layer 2 Ethernet or a Layer 3 IP network, or any other packet switched network. When connected in a wireless communication network, the BBU is connected to other base stations, e.g. eNodeBs in a 3G/4G network via an X2 interface, and/or the BBU is connected to other radio access network nodes such as a Mobility Management Entity, MME, or Serving Gateway, SGW, in a 3G/4G network via an S1 interface.

Figure 3:
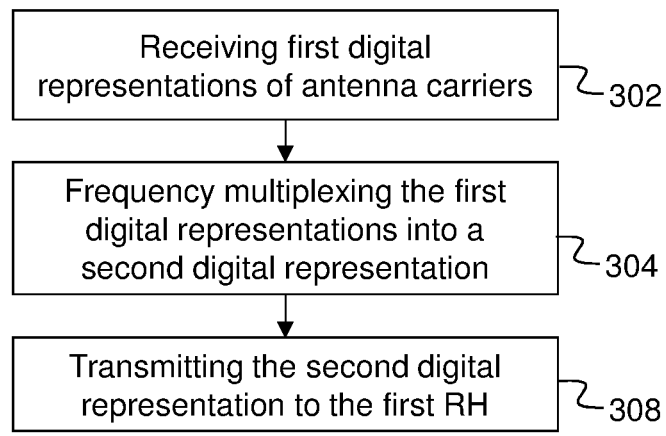
FIG. 3 is a flow chart illustrating a method performed by an IRU, according to possible embodiments.

FIG. 3, in conjunction with FIG. 2, shows an embodiment of a method performed by an IRU 210 of a base station system 200, the base station system comprising the IRU 210, a BBU 230 connected to the IRU 210, and a first RH 221 connected to the IRU 210 via a packet data network 240. The first RH 221 is arranged for wireless transmission in radio frequency, RF, of a plurality of antenna carriers to user equipments, UEs 250, the plurality of antenna carriers being transmitted from the first RH at individually different RFs. The method comprises receiving 302, from the BBU 230, a plurality of first digital representations of the plurality of antenna carriers of the first RH 221, each first digital representation representing one antenna carrier, the plurality of first digital representations being received in a baseband frequency range. The method further comprises frequency multiplexing 304 the plurality of first digital representations of the plurality of antenna carriers into a second digital representation over a first bandwidth, and transmitting 308 the second digital representation to the first RH 221.

By frequency multiplexing digital representations of each of a plurality of antenna carriers for one RH into one common digital representation over a first bandwidth, digital front end functions such as CFR, DPD can be performed on the common second digital representation instead of on each of the individual first digital representations. This also makes it possible to centralize digital front end functions at the IRU instead of having individual digital front-ends at the RHs. This allows for slimmer RHs compared to the RHs handling digital downlink signals used in prior art.

The term "radio head" (RH) is meant to cover the concept of RU as well as RH. The term "antenna carrier" is to be interpreted as signals sent over a carrier bandwidth from the BBU via the antenna of the RH to the UE. There are normally a plurality of antenna carriers per antenna per RH or at least per RH. The different antenna carriers of one RH are transmitted at individually different RF bandwidths from the RH to the UE. The antenna carriers are transported in antenna carrier containers, see e.g. CPRI specification V7.0. The antenna carrier could alternatively be called antenna carrier signals to define that there are signals that are sent in a carrier bandwidth. From the BBU, a plurality of first digital representations of different antenna carrier is received in a base frequency bandwidth, i.e. baseband, at the IRU. The first bandwidth over which the first digital representations are frequency multiplexed into a second digital representation may be in a baseband frequency range or in an intermediate frequency range in between baseband and RF. The first bandwidth may be an instantaneous bandwidth, also called intermediate bandwidth, IBW. The IBW can be seen as the largest bandwidth that a radio receiver or radio transmitter in the RH can access without changing the local oscillator. The concept of IBW is independent of center frequency: If 100 MHz IBW is wanted at the RH, i.e. at radio frequency, RF, range, also 100 MHz IBW is needed at an intermediate frequency in between baseband and RF if an intermediate frequency is used for the IBW, and also 100 MHz IBW is needed at baseband if baseband is used for the IBW. At baseband, signals are complex with both positive and negative frequencies so the signal will be from −50 to +50 MHz but the bandwidth is the same. The BBU 230 may be connected to the IRU 210 via a point-to-point connection, which be a wireline connection.

According to an embodiment, in the frequency multiplexing 304, the plurality of antenna carriers are distributed in frequency across the first bandwidth according to their individual RFs for transmission from the first RH 221 to the UEs. In other words, the plurality of antenna carriers are distributed along the first bandwidth of the second digital representation in the same frequency relation as they are to have when being transmitted in radio frequency from the first RH. Hereby, the first RH does not need to de-multiplex the received plurality of antenna carriers as in prior art. Instead, the first RH can take the received second representation including the plurality of antenna carriers and just convert the second representation including the respective frequency of each of the plurality of antenna carriers from the IBW into the RF, and then transmit the frequency-converted antenna carriers wirelessly from the first RH. This simplifies the RHs a lot, which makes the RHs more cost-efficient, compare to sending individual antenna carriers to the first RH.

Figure 4:
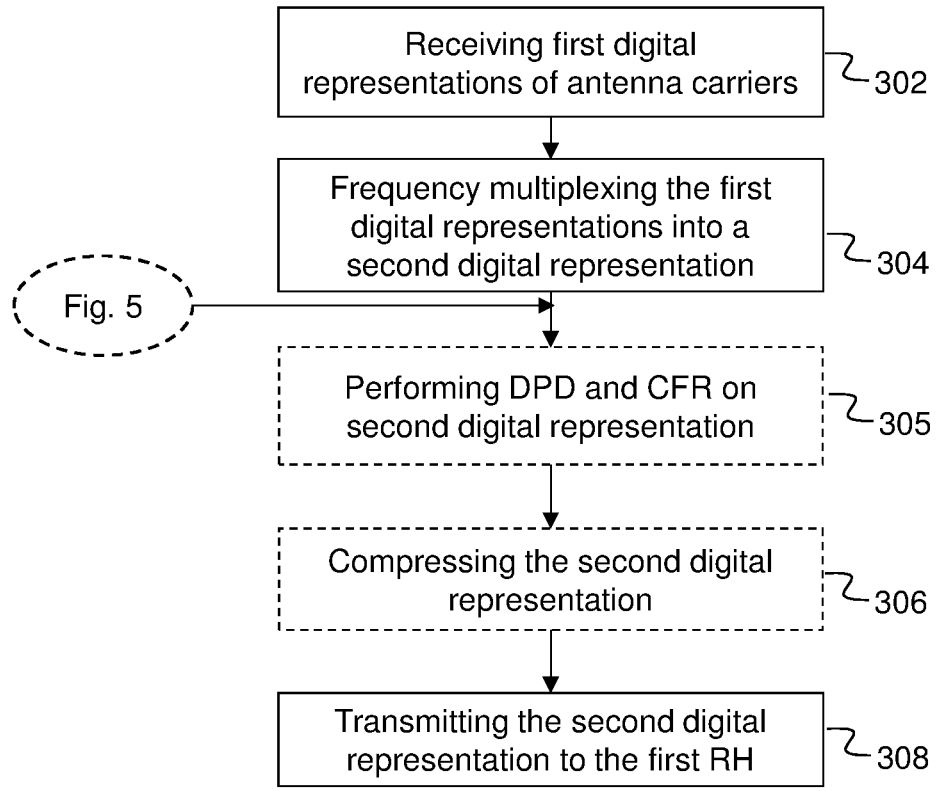
FIGS. 4-5 are other flow charts illustrating other methods performed by an IRU, according to possible embodiments.

FIG. 4 shows embodiments of the method shown in FIG. 3. According to one embodiment, the method described in FIG. 3 further comprises performing 305, crest factor reduction, CFR, and digital pre-distortion, DPD, on the second digital representation, before the transmission 308 of the second digital representation to the first RH. As the CFR and DPD is performed in the IRU instead of in the RH, the RH can be produced smaller and lower powered, i.e. to a lower cost than an RH comprising CFR and DPD functionality. Another benefit is that it may be possible to perform DPD and CFR on the common second digital representation instead of performing it individually for each antenna carrier at the RH. A bandwidth reduction compression algorithm may be used on the second digital representation. The bandwidth reduction compression algorithm may be an algorithm that does not change the sampling rate such as LPC, if combined with DPD, as the signal on which DPD is to be performed needs to be 3-5 times oversampled to be correctly performed.

According to another embodiment shown in FIG. 4, the method of FIG. 3 further comprises compressing 306 the second digital representation into a compressed second digital representation. Further, the transmitting 308 comprises transmitting the compressed second digital representation to the first RH. The compressed second digital representation has fewer bits than the non-compressed second digital representation. In case CFR and DPD is performed on the second digital representation, the compression may be performed after CFR and DPD. Hereby, communication resources in the packet data network are saved.

According to an alternative to the above embodiment, the compressing 306 comprises resampling as well as vector quantization and/or transform coding of the second digital representation. By resampling and then also vector quantizing and/or performing transform coding onto the resampled second digital representation, the bit rate of the transmission to the first RH could be reduced forward, for example to reach a level where a lower speed Ethernet technology can be used for the packet data network, i.e. a cost-efficient packet data network can be used. A suitable example of transform coding is Linear Predictive Coding, LPC. Also, noise shaping may be used.

According to another alternative, the compressing 306 comprises a power spectrum density, PSD, dependent compression of the second digital representation. Hereby, the bit rate of the transmission to the first RH can be reduced when data to be sent on the antenna carriers does not fully load the antenna carriers in the first bandwidth. The PSD dependent compression may be an adaptive load dependent compression.

Figure 5:
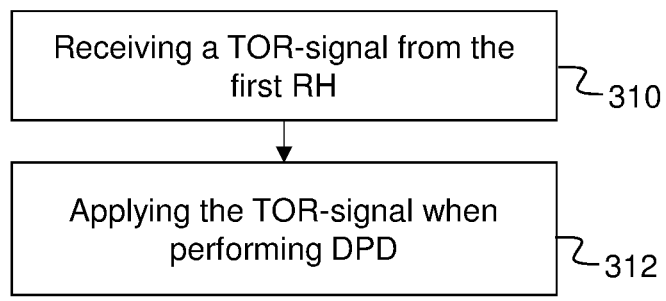

According to another embodiment, which is shown in FIG. 5, the method further comprises receiving 310, from the first RH 221, a digital transmitter observation receiver, TOR, signal, the TOR signal being the second digital representation frequency-converted into RF and amplified by the first RH, and applying 312 the digital TOR signal when performing the DPD. A TOR circuit in the RH sample and digitize an output signal from a power amplifier of the RH. The output signal from the power amplifier is the second digital representation frequency converted into RF, DA-converted and amplified by the RH before being sent to the respective antenna for wireless transmission. The sampled and digitized output signal, i.e. the TOR signal, is a signal comprising the wanted output plus intermodulation distortion products mainly generated in the power amplifier. Typically, the TOR needs higher measurement bandwidth than the first bandwidth, e.g. 3 times higher bandwidth. From the TOR signal it is possible to calculate an inverse function of the power amplifier nonlinearities. This inverse is then applied on the second digital representation, after CFR, and this operation is the DPD. Basically, the DPD will amplify strong samples slightly more than weak samples in order to counteract the PA's characteristic. In prior art, the DPD as well as the power amplifier is in the RH. However, according to an embodiment of this invention, the DPD is performed in the IRU. As calculating and applying DPD has high computational complexity, the RH could be simplified by moving the DPD to IRU. The problem is that the TOR is in the RH. By sending a signal comprising the TOR to the IRU, the IRU can perform the DPD. As shown in FIG. 4, the steps of FIG. 5 is to be performed before the step 305 of performing CFR and DPD on the second digital representation, in the embodiment where CFR and DPD are performed.

According to an alternative of this embodiment, the received digital TOR signal is compressed. By compressing the TOR signal, e.g. by LPC, it is possible to send the TOR signal on the uplink, i.e. from the RH to the IRU, in Time Division Duplex, TDD, instead of regular uplink signals. A compression may be necessary as the bandwidth of the uncompressed TOR-signal is often higher than the available bandwidth on the uplink. Further, sending the TOR-signal on the uplink would be an efficient usage of transmission resources as the uplink is not used during downlink transmission in TDD mode.

According to another embodiment, the first RH 221 has a first antenna and a second antenna, and a first set of the first digital representations are representations of antenna carriers of the first antenna, and a second set of the first digital representations are representations of antenna carriers of the second antenna. Further, the frequency multiplexing 304 into the second digital representation comprises frequency multiplexing the first set of the first digital representations into a primary second digital representation, and frequency multiplexing the second set of the first digital representations into a secondary second digital representation. The transmitting 308 then comprises transmitting the primary second digital representation to the first RH 221 and transmitting the secondary second digital representation to the first RH. In case the first RH has more than one antenna, e.g. a first and a second antenna, the first digital representations of antenna carriers of the first antenna are multiplexed and sent into one second digital representation, which at the first RH is directed to the transmitter of the first antenna. In a similar way, the first digital representations of antenna carriers of the second antenna are multiplexed and sent into another second digital representation, which at the first RH is directed to the transmitter of the second antenna.

Figure 6:
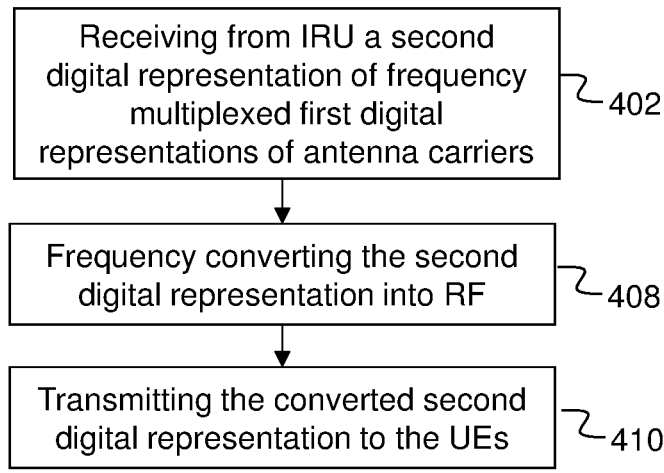
FIG. 6 is a flow chart illustrating a method performed by an RH, according to possible embodiments.

FIG. 6, in conjunction with FIG. 2, describes an embodiment of a method performed by an RH 221 of a base station system 200, the RH 221 being arranged for wireless transmission in radio frequency, RF, of a plurality of antenna carriers to UEs 250. The plurality of antenna carriers are to be transmitted from the RH 221 at individually different RFs. The base station system comprises the RH 221, an IRU 210 connected to the RH 221 via a packet data network 240, and a BBU 230 connected to the IRU 210. The method comprises receiving 402, from the IRU 210, a second digital representation in a first bandwidth, the second digital representation comprising a plurality of first digital representations of the plurality of antenna carriers, each first digital representation representing one antenna carrier, the plurality of first digital representations of the plurality of antenna carriers being frequency multiplexed into the second digital representation across the first bandwidth. The method further comprises frequency converting 408 the second digital representation into radio frequency, and wirelessly transmitting 410 the converted second digital representation to the UEs 250.

According to an embodiment, in the received second digital representation, the plurality of antenna carriers are distributed in frequency along the first bandwidth according to their individual RFs for transmission from the RH 221 to the UEs.

Figure 8:
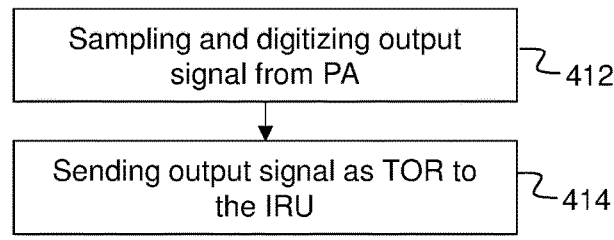

FIG. 8 describes an embodiment of the method described in FIG. 6. According to the embodiment of FIG. 8, the RH 221 comprises a power amplifier for amplifying the frequency converted second digital representation. Further, the method further comprises sampling and digitizing 412 an output signal from the power amplifier, and sending 414 the sampled and digitized output signal to the IRU 210 as a digital transmit observation receiver signal, TOR signal, for use by the IRU when performing DPD. The output signal from the power amplifier is an amplified version of the received and frequency converted second digital representation. According to an alternative, the TOR signal is compressed before it is sent 414 to the IRU.

Figure 7:
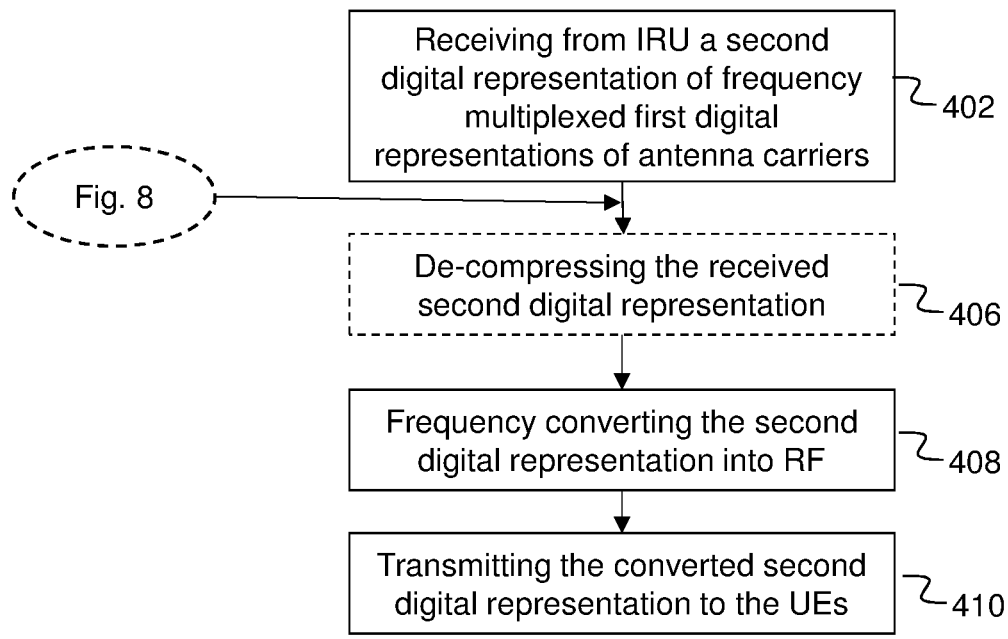
FIGS. 7-8 are other flow charts illustrating other methods performed by an RH, according to possible embodiments.

FIG. 7 shows an embodiment of the method described in FIG. 6. According to the embodiment of FIG. 7, the received second digital representation is a compressed version of an original version of the second digital representation, the second digital representation being compressed according to a compression scheme. Further, the method further comprises de-compressing 406 the received second digital representation according to the compression scheme to obtain a version of the second digital representation corresponding to the original version.

According to an embodiment, the RH 221 has a first antenna and a second antenna. Further, the received second digital representation comprises a primary second digital representation comprising a first set of the first digital representations that are representations of antenna carriers of the first antenna, the first set of the first digital representations being frequency multiplexed into the primary second digital representation. The received second digital representation further comprises a secondary second digital representation comprising a second set of the first digital representations that are representations of antenna carriers of the second antenna, the second set of the first digital representations being frequency multiplexed into the secondary second digital representation. The method further comprises transporting the primary second digital representation to the first antenna and the secondary second digital representation to the second antenna for wireless transmission from the respective first and second antenna to the UEs.

Figure 1A:
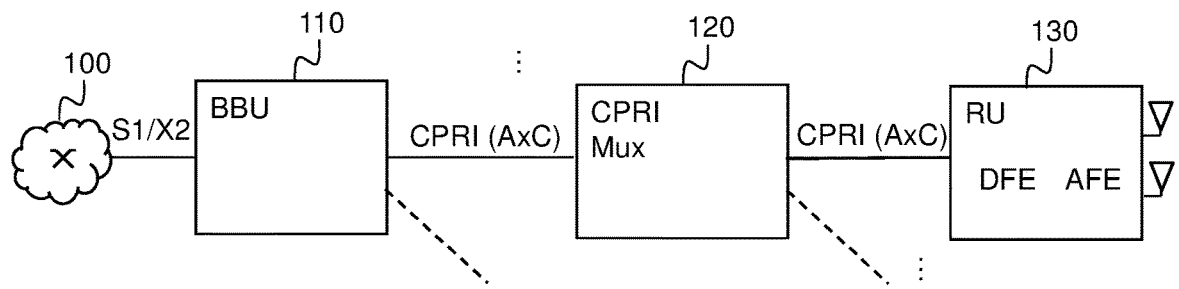
FIGS. 1a-1c are block diagrams of distributed base station systems according to the prior art.
Figure 1B:
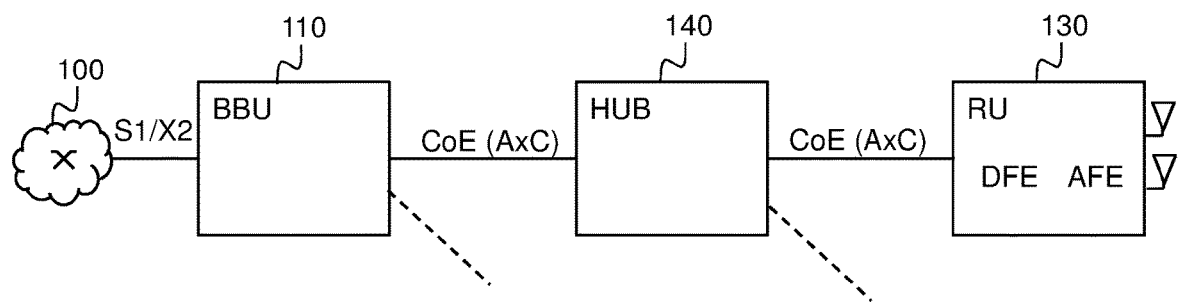

According to an embodiment and compared to the prior art systems of FIGS. 1a and 1b, the IRU takes the place of the Mux and HUB, respectively. The IRU hosts the DFE functionality instead of the RH, and the RH only provides fronthaul interfacing and AFE functionality.

Figure 1C:
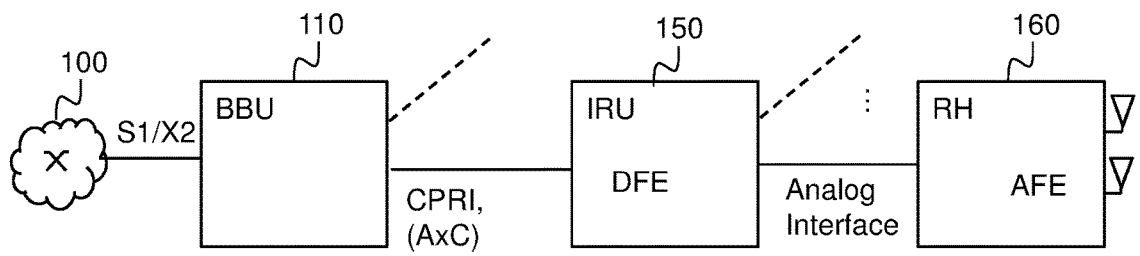

According to an embodiment, instead of using an analog interface between the IRU 210 and the RH 221 as in the prior art of FIG. 1c, the interface is a digital packet based network, such as Ethernet. And instead of sending analog versions of the antenna carriers between the IRU and the RH, digital signal representations of antenna carriers are multiplexed into an IBW that is packetized into e.g. Ethernet frames and sent over the digital packet based network to the RH. It should be noted that there is an ongoing development of an evolved CPRI, eCPRI that specifies packet transport mechanisms of radio signals over packet data network such as Layer 2/Layer 3 Ethernet/IP networks instead of point to point fibers. This will allow for using eCPRI over the packet data network between the IRU and the RH. eCPRI allows for service diversity and a better utilization of the network.

According to an embodiment, the IRU receives a plurality of base-band antenna carriers. DFE functionality in the IRU multiplexes the carriers in frequency to their final carrier frequency location in relation to each other and to the configured power levels in baseband. This compound of carriers is called the IBW and reflects a copy of what would be radiated from one antenna of an RH on RF, but in baseband. In other words, in the IBW, the antenna carriers are a digital version of the analog signal to be transmitted from the antennas, with the same distance in frequency between the antenna carriers as they will have when transmitted from the antenna, only in baseband instead of in RF. As the RH receives the IBW, it only needs to DA convert the IBW, frequency transform the IBW from baseband to RF and send the transformed DA converted IBW from its antenna. In case the RH has more than one antenna, the antenna carriers would be frequency multiplexed into separate IBWs per antenna, depending on to which antenna the different antenna carriers belong.

Figure 9A:
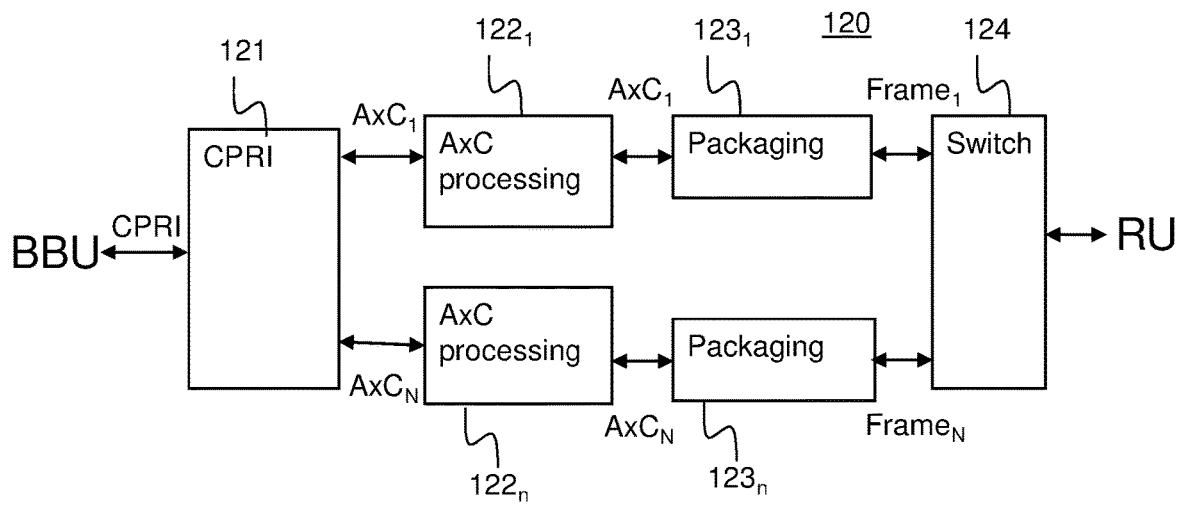
FIG. 9a is a block diagram of a CPRI Mux of the prior art of FIG. 1a, in more detail.

FIG. 9a shows details of the CPRI Mux 120 of the prior art system shown in FIG. 1a. Antenna carriers, AxCs are received over CPRI from the BBU at a CPRI unit 121. The CPRI unit 121 demultiplexes the AxCs from the common CPRI signal into individual AxCs and sends them to individual AxC processing units $122_1$-$122_n$ so that the individual AxCs are processed individually by the AxC processing units. The processing may be compression in downlink and decompression in uplink. The individual AxCs are then packaged into frames by individual AxC packaging units $123_1$-$123_n$. A packet switch 124 forwards the packetized antenna carriers towards the targeted RU where DFE processing takes place. In other words, the processing is here per AxC and there will be one frame flow per AxC.

Figure 9B:
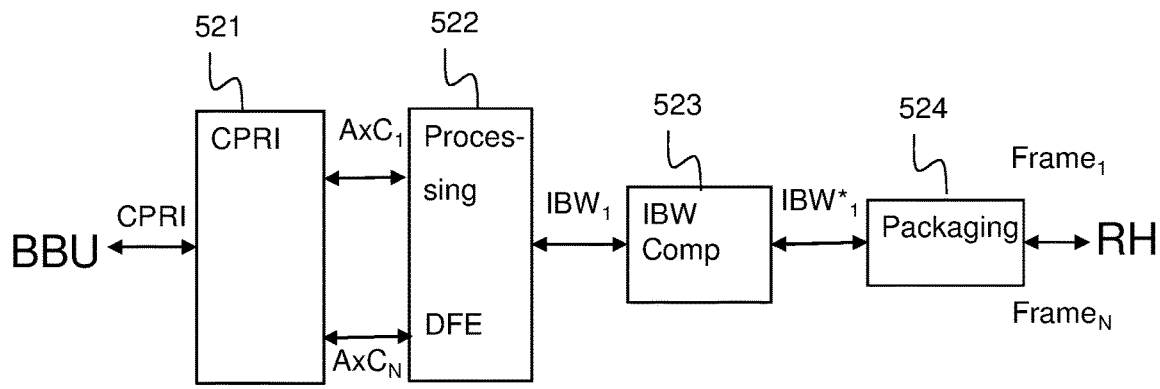
FIG. 9b is a block diagram of an IRU of FIG. 2 in more detail, according to possible embodiments.

FIG. 9b shows details of an IRU according to embodiments of the invention. AxCs are received over CPRI from the BBU at a CPRI unit 521. The CPRI unit 521 demultiplexes the AxCs from the common CPRI signal into individual AxCs. The individual AxCs are then processed by a processing unit 522. The processing unit 522 frequency multiplexes the AxCs for a given RH into IBW in complex baseband as an $IBW_1$ signal. The index "1" in $IBW_1$ signifies one RH, or the first RH. The multiple carriers for a given RH are configured in power and frequency relations in the same way as they are to be when transmitted from the RH in RF. The processing unit 522 further performs DFE functions such as DPD and CFR on the IBW signal. The processed IBW signal is compressed in a compression unit 523 into a compressed IBW, IBW*. If there are gaps in the IBW, it is preferable to use a compression scheme that can utilize the gaps to reduce the fronthaul bit rate. A mix of e.g. resampling and LPC coding, that may include linear prediction and entropy coding, could reduce the bitrate to a level where a lower speed Ethernet technology can be used, e.g. 2.5GBASE-T instead of 5GBASE-T or 10GBASE-T. Also, an adaptive, load dependent compression can reduce the bit rate further when the traffic does not fully load the carriers in the IBW. The IBW for each RH is then packaged into a frame flow by a packaging unit 524 to be transmitted over the packet network to the given RHs. 1588 sync and/or SyncE can be used to carry synchronization data.

Figure 10:
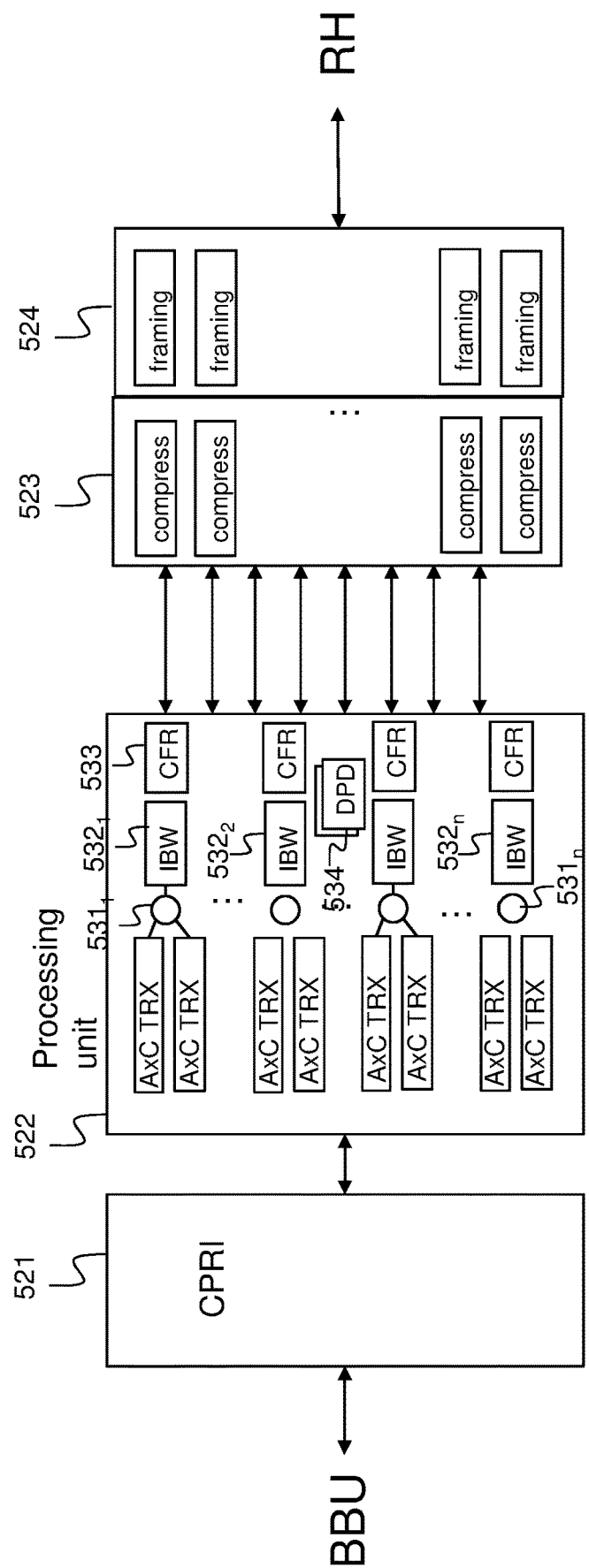
FIG. 10 is another block diagram of an IRU in more detail, according to possible embodiments.

FIG. 10 shows an embodiment of an IRU in more detail. The processing unit 522 receives the individually separated AxCs and frequency multiplexes the AxCs belonging to the same RH. In case the RH has more than one antenna, the AxCs belonging to the same antenna of the same RH are frequency multiplexed in a multiplexors $531_1$-$531_n$ into IBW signals $532_1$-$532_n$. Then, DFE functions such as CFR 533 and DPD 534 are performed on the IBW signals. The DFE processed IBW signals are then fed to a compression unit 523 similar to the compression unit of FIG. 9b, for being compressed, and further fed to a packaging unit 524 similar to the packaging unit of FIG. 9b for being packaged into frames before being transmitted to the RH.

Figure 11:
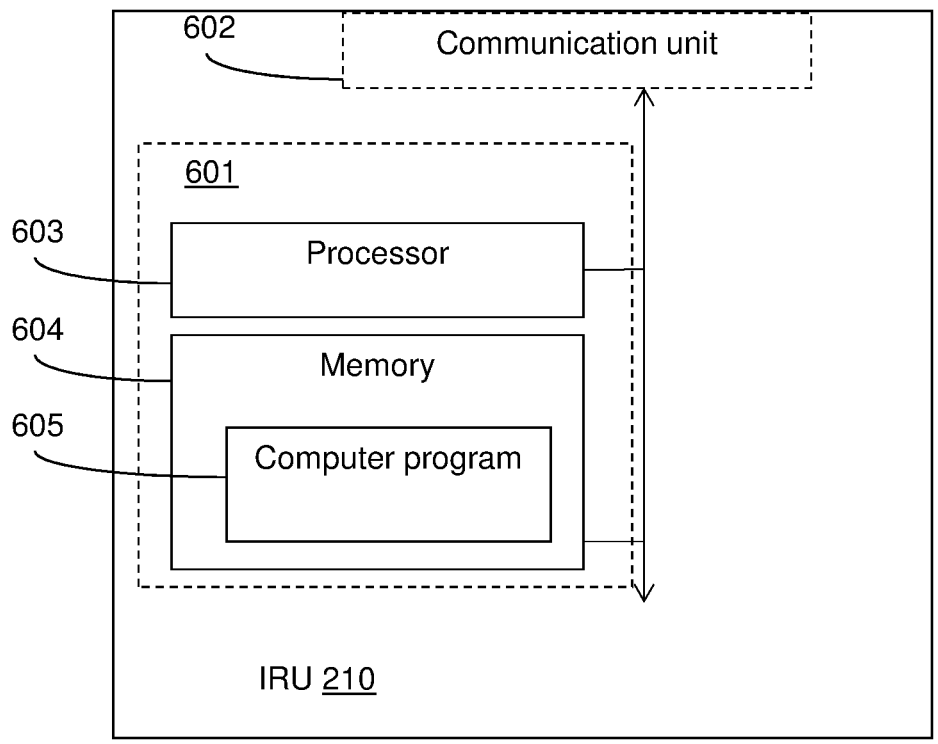
FIG. 11-12 are block diagrams of an IRU according to possible embodiments.

FIG. 11, in conjunction with FIG. 2, shows an IRU 210 operable in a base station system 200. The base station system comprises the IRU 210, a BBU 230 connected to the IRU 210, and a first RH 221 connected to the IRU 210 via a packet data network 240. The first RH 221 is arranged for wireless transmission in RF of a plurality of antenna carriers to UEs 250. The plurality of antenna carriers are to be transmitted from the first RH at individually different RFs. The IRU 210 comprises a processor 603 and a memory 604. The memory contains instructions executable by said processor, whereby the IRU 210 is operative for receiving, from the BBU 230, a plurality of first digital representations of the plurality of antenna carriers of the first RH 221, each first digital representation representing one antenna carrier, the plurality of first digital representations being received in a baseband frequency range. The IRU 210 is further operative for frequency multiplexing the plurality of first digital representations of the plurality of antenna carriers into a second digital representation over a first bandwidth, and transmitting the second digital representation to the first RH 221.

According to an embodiment, the IRU 210 is operative for, when frequency multiplexing, distributing the plurality of antenna carriers in frequency across the first bandwidth according to their individual RFs for transmission from the first RH 221 to the UEs.

According to an embodiment, the IRU 210 is further operative for performing CFR and DPD on the second digital representation, before transmission of the second digital representation to the first RH.

According to another embodiment, the IRU 210 is further operative for receiving, from the first RH, a digital TOR signal, the TOR signal being the second digital representation frequency-converted into RF and amplified by the first RH, and applying the digital TOR signal when performing the DPD.

According to an embodiment, the IRU 210 is further operative for compressing the received digital TOR signal.

According to another embodiment, the IRU 210 is further operative for compressing the second digital representation into a compressed second digital representation, and for transmitting the compressed second digital representation to the first RH.

According to another embodiment, the first RH 221 has a first antenna and a second antenna and a first set of the first digital representations are representations of antenna carriers of the first antenna and a second set of the first digital representations are representations of antenna carriers of the second antenna. Further, the IRU 210 is operative for frequency multiplexing the first set of the first digital representations into a primary second digital representation and frequency multiplexing the second set of the first digital representations into a secondary second digital representation, and for transmitting the primary second digital representation to the first RH 221 and transmitting the secondary second digital representation to the first RH 221.

According to other embodiments, the IRU 210 may further comprise a communication unit 602, which may be considered to comprise conventional means for communicating with the BBU 230 and with the RHs 221-223. The instructions executable by said processor 603 may be arranged as a computer program 605 stored e.g. in the memory 604. The processor 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above.

The computer program 605 may comprise computer readable code means, which when run in IRU 210 causes the IRU 210 to perform the steps described in any of the described embodiments of the IRU 210. The computer program 605 may be carried by a computer program product connectable to the processor 603. The computer program product may be the memory 604. The memory 604 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory 604. Alternatively, the computer program may be stored on a server or any other entity connected to the communication network to which the IRU 210 has access via the communication unit 602. The computer program may then be downloaded from the server into the memory 604.

Figure 12:
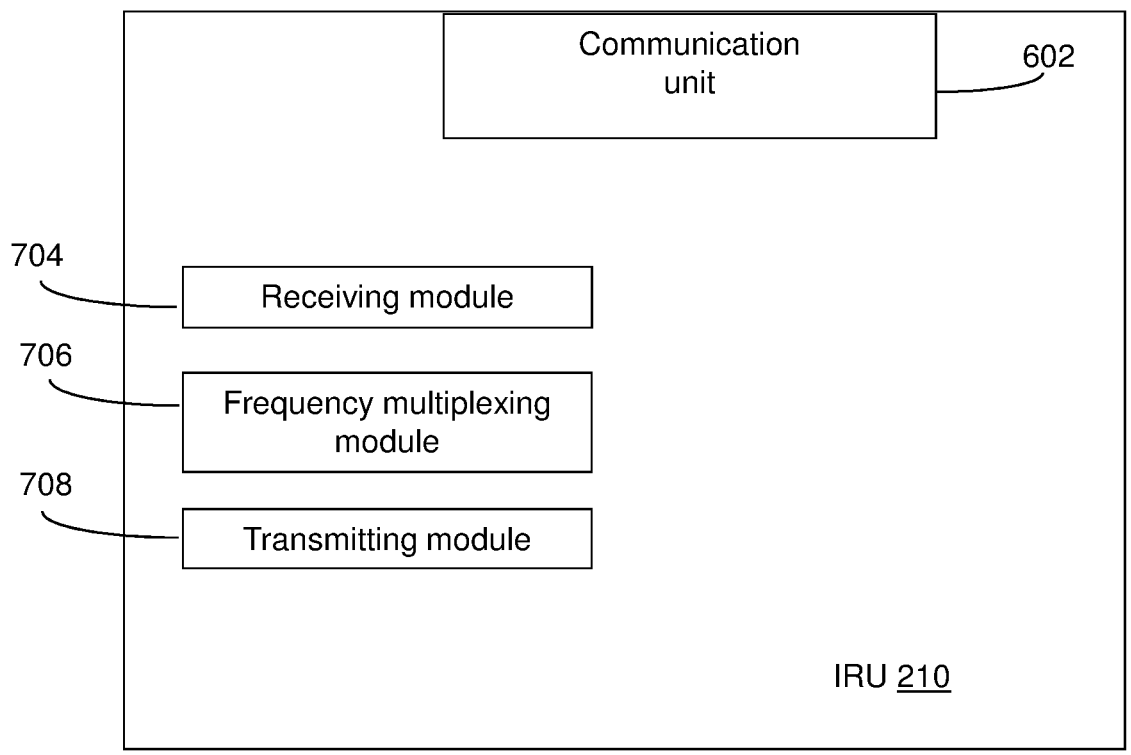

FIG. 12, in conjunction with FIG. 2, shows an alternative embodiment of an IRU 210 operable in a base station system 200. The base station system comprises the IRU 210, a BBU 230 connected to the IRU 210, and a first RH 221 connected to the IRU 210 via a packet data network 240. The first RH 221 is arranged for wireless transmission in RF of a plurality of antenna carriers to UEs 250. The plurality of antenna carriers are transmitted from the first RH at individually different RFs. The IRU 210 comprises a receiving module 704 for receiving, from the BBU 230, a plurality of first digital representations of the plurality of antenna carriers of the first RH 221, each first digital representation representing one antenna carrier, the plurality of first digital representations being received in a baseband frequency range. The IRU further comprises a frequency multiplexing module 706 for frequency multiplexing the plurality of first digital representations of the plurality of antenna carriers into a second digital representation over a first bandwidth, and a transmitting module 708 for transmitting the second digital representation to the first RH 221. The IRU 210 may further comprise a communication unit 602 similar to the communication unit of FIG. 11.

Figure 13:
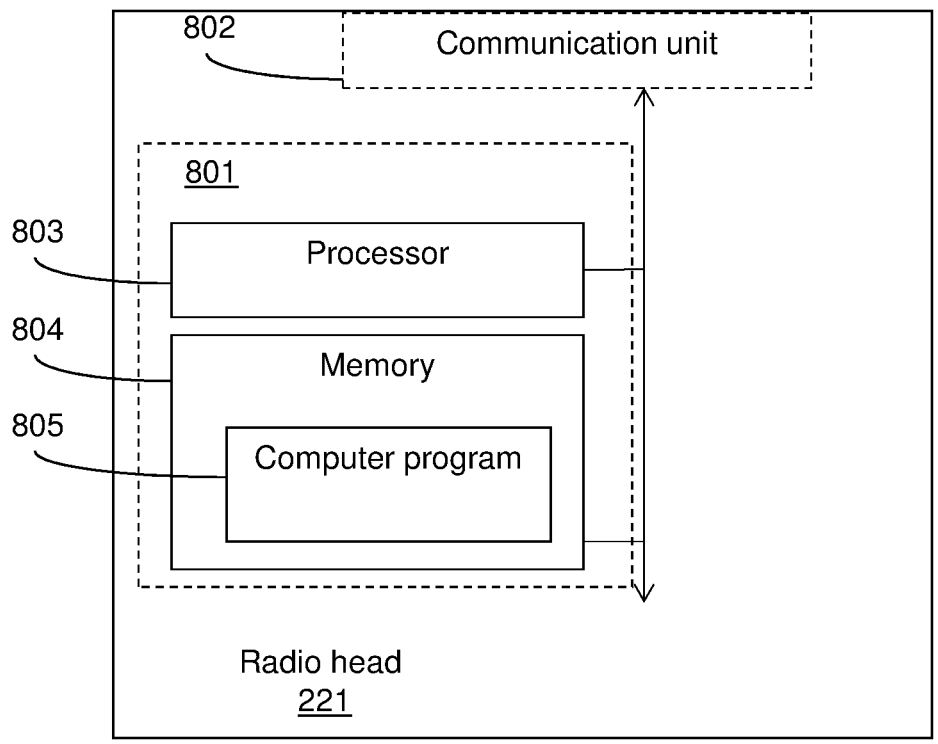
FIG. 13-14 are block diagrams of an RH, according to possible embodiments.

FIG. 13, in conjunction with FIG. 2, shows an RH 221 operable in a base station system 200. The RH 221 is arranged for wireless transmission in RF of a plurality of antenna carriers to UEs 250. The plurality of antenna carriers are to be transmitted from the RH 221 at individually different RFs. The base station system comprises the RH 221, an IRU 210 connected to the RH 221 via a packet data network 240, and a BBU 230 connected to the IRU 210. The RH 221 comprises a processor 803 and a memory 804. The memory contains instructions executable by said processor, whereby the RH 221 is operative for receiving, from the IRU 210, a second digital representation in a first bandwidth, the second digital representation comprising a plurality of first digital representations of the plurality of antenna carriers, each first digital representation representing one antenna carrier, the plurality of first digital representations of the plurality of antenna carriers being frequency multiplexed into the second digital representation across the first bandwidth. The RH 221 is further operative for frequency converting the second digital representation into radio frequency, and for wirelessly transmitting the converted second digital representation to the UEs 250.

According to an embodiment, the RH 221 comprises a power amplifier for amplifying the frequency converted second digital representation. The RH is further operative for sampling and digitizing an output signal from the power amplifier, and sending the sampled and digitized output signal to the IRU 210 as a TOR signal, for use by the IRU when performing DPD.

According to another embodiment, the RH 221 is further operative for compressing the TOR signal before sending the TOR signal to the IRU.

According to another embodiment the received second digital representation is a compressed version of an original version of the second digital representation, the second digital representation being compressed according to a compression scheme. Further, the RH is operative for de-compressing the received second digital representation according to the compression scheme to obtain a version of the second digital representation corresponding to the original version.

According to other embodiments, the RH 221 may further comprise a communication unit 802, which may be considered to comprise conventional means for communication with the IRU 210 as well as for wireless communication with UEs wirelessly connected to the RH. The communication unit 802 may for this reason comprise transmitting units for transmitting wireless signals and receiving units for receiving wireless signals. The instructions executable by said processor 803 may be arranged as a computer program 805 stored e.g. in said memory 804. The processor 803 and the memory 804 may be arranged in a sub-arrangement 801. The sub-arrangement 801 may be a micro-processor and adequate software and storage therefore, a Programmable Logic Device, PLD, or other electronic component(s)/processing circuit(s) configured to perform the actions and/or methods mentioned above.

The computer program 805 may comprise computer readable code means, which when run in the RH 221 causes the RH to perform the steps described in any of the described embodiments of the RH. The computer program 805 may be carried by a computer program product connectable to the processor 803. The computer program product may be the memory 804. The memory 804 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory 804. Alternatively, the computer program may be stored on a server or any other entity connected to the communication network to which the RH has access via the communication unit 802. The computer program may then be downloaded from the server into the memory 804.

Figure 14:
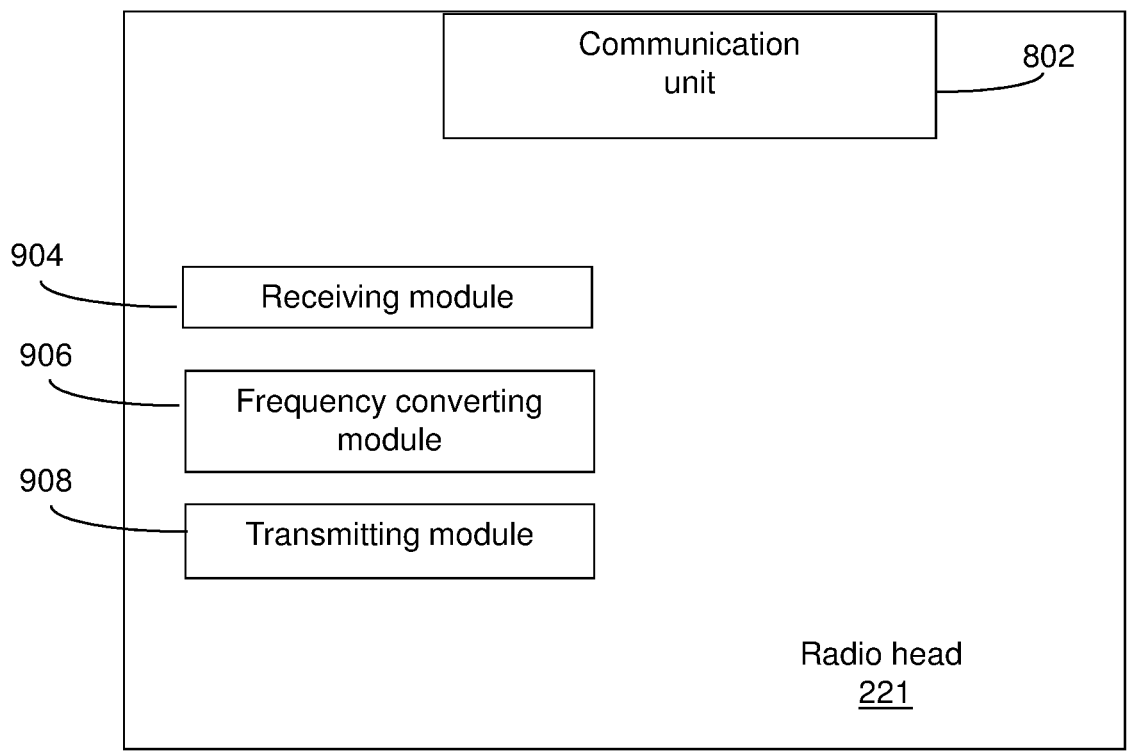

FIG. 14, in conjunction with FIG. 2, shows an alternative embodiment of an RH 221 operable in a base station system 200. The RH 221 is arranged for wireless transmission in RF of a plurality of antenna carriers to UEs 250. The plurality of antenna carriers are to be transmitted from the RH 221 at individually different RFs. The base station system comprises the RH 221, an IRU 210 connected to the RH 221 via a packet data network 240, and a BBU 230 connected to the IRU 210. The RH 221 comprises a receiving module 904 for receiving, from the IRU 210, a second digital representation in a first bandwidth, the second digital representation comprising a plurality of first digital representations of the plurality of antenna carriers, each first digital representation representing one antenna carrier, the plurality of first digital representations of the plurality of antenna carriers being frequency multiplexed into the second digital representation across the first bandwidth. The RH 221 further comprises a frequency converting module 906 for frequency converting the second digital representation into radio frequency, and a transmitting module 908 for wirelessly transmitting the converted second digital representation to the UEs 250.

The present invention may be used in any radio access technology and on antenna carriers of any radio access technology, such as Global System for Mobile communication, GSM, Wideband Code Division Multiple Access, WCDMA, Long Term Evolution, LTE, Next Evolution, NE.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A base station system, comprising:
a baseband unit (BBU); and
an intermediate radio unit (IRU) operable to communicate with a first radio head (RH), the first RH being arranged for wireless transmission in radio frequency (RF) of a plurality of antenna carriers to user equipments (UEs), wherein:
the BBU is configured to produce a plurality of digital data flows, each digital data flow being associated with a different one of the plurality of antenna carriers, and
the IRU is further configured to:
receive in a baseband frequency range the plurality of digital data flows;
multiplex the plurality of digital data flows into a frequency multiplexed digital intermediate bandwidth (IBW) signal comprising the plurality of digital data flows;
process the digital IBW signal comprising the plurality of digital data flows to produce a processed digital IBW signal comprising the plurality of digital data flows; and
transmit to the first RH the processed digital IBW signal comprising the plurality of digital data flows.

2. The base station system of claim 1, wherein the IRU is configured to process the digital IBW signal by performing crest factor reduction (CFR) and digital pre-distortion (DPD) on the digital IBW signal.

3. The base station system of claim 2, wherein the IRU is further configured to:
receive, from the first RH, a digital Transmitter Observation Receiver (TOR) signal, the TOR signal being the digital IBW signal frequency-converted into RF and amplified by the first RH, wherein
the IRU is configured to perform the DPD on the digital IBW signal by applying the digital TOR signal when performing the DPD.

4. The base station system of claim 3, wherein the digital TOR signal is compressed.

5. The base station system of claim 1, wherein the IRU is further configured to compress the digital IBW signal.

6. The base station system of claim 5, wherein the compressing comprises resampling as well as vector quantization and/or transform coding of the IBW signal.

7. The base station system of claim 5, wherein the compressing comprises a power spectrum density (PSD) dependent compression of the IBW signal.

8. The base station system of claim 1, wherein
the first RH has a first antenna and a second antenna,
a first set of the digital data flows are representations of antenna carriers of the first antenna,
a second set of the digital data flows are representations of antenna carriers of the second antenna, the frequency multiplexing into the IBW signal comprises:
a) frequency multiplexing the first set of the digital data flows into a primary digital representation; and
b) frequency multiplexing the second set of the digital data flows into a secondary digital representation, and
the transmitting comprises transmitting the primary digital representation to the first RH and transmitting the secondary digital representation to the first RH.

9. The base station system of claim 1, wherein the IRU and the BBU are integral components of a BBU node.

10. A method for modifying a base station system comprising a Common Public Radio Interface (CPRI) cross multiplexing unit (Mux), the method comprising:
replacing the CPRI Mux with an intermediate radio unit (IRU); and
connecting the IRU to a baseband unit (BBU) of the base station system, wherein the IRU comprises:
a processor; and
a memory, said memory containing instructions executable by said processor, wherein the IRU is operative for:
receiving, from the BBU, a plurality of digital data flows, each digital data flow being associated with a different one of a plurality of antenna carriers, the plurality of digital data flows being received in a baseband frequency range;
frequency multiplexing the plurality of digital data flows into a frequency multiplexed digital intermediate bandwidth (IBW) signal comprising the plurality of digital data flows;
processing the IBW signal comprising the plurality of digital data flows to produce a processed IBW signal comprising the plurality of digital data flows; and
transmitting the processed IBW signal comprising the plurality of digital data flows to a first radio head (RH) being arranged for wireless transmission in radio frequency (RF) of the plurality of antenna carriers to user equipments (UEs).

11. The method of claim 10, wherein the IRU and the BBU are integral components of a BBU node.

12. A server comprising non-transitory computer readable medium storing a computer program comprising computer readable code means to be run in an intermediate radio unit (IRU) of a base station system, which computer readable code means when run in the IRU causes the IRU to perform a method comprising:
receiving a plurality of digital data flows, each digital data flow being associated with a different one of a plurality of antenna carriers, the plurality of digital data flows being received in a baseband frequency range;
frequency multiplexing the plurality of digital data flows into a frequency multiplexed digital intermediate bandwidth (IBW) signal comprising the plurality of digital data flows;
processing the IBW signal comprising the plurality of digital data flows to produce a processed IBW signal comprising the plurality of digital data flows; and
transmitting the processed IBW signal comprising the plurality of digital data flows to a first radio head (RH).

13. The server of claim 12, wherein the step of processing the digital IBW signal comprises the IRU performing crest factor reduction (CFR) and digital pre-distortion (DPD) on the digital IBW signal.

14. The server of claim 13, wherein
the method further comprises the IR receiving, from the first RH, a digital Transmitter Observation Receiver (TOR) signal, the TOR signal being the digital IBW signal frequency-converted into RF and amplified by the first RH, and
the step of performing the DPD on the digital IBW signal comprises applying the digital TOR signal when performing the DPD.

15. The server of claim 14, wherein the received digital TOR signal is compressed.

16. The server of claim 12, wherein the step of processing the digital IBW signal further comprises the IRU compressing the digital IBW signal.

17. The server of claim 16, wherein the step of compressing comprises resampling as well as vector quantization and/or transform coding of the IBW signal.

18. The server of claim 16, wherein the step of compressing comprises a power spectrum density (PSD) dependent compression of the IBW signal.

19. The server of claim 12, wherein
the first RH has a first antenna and a second antenna,
a first set of the digital data flows are representations of antenna carriers of the first antenna,
a second set of the digital data flows are representations of antenna carriers of the second antenna,
the frequency multiplexing into the IBW signal comprises:
a) frequency multiplexing the first set of the digital data flows into a primary digital representation; and
b) frequency multiplexing the second set of the digital data flows into a secondary digital representation, and
the transmitting comprises transmitting the primary digital representation to the first RH and transmitting the secondary digital representation to the first RH.

\* \* \* \* \*

UNITED STATES PATENT AND TRADEMARK OFFICE
CERTIFICATE OF CORRECTION

PATENT NO. : 11,737,173 B2
APPLICATION NO. : 17/845334
DATED : August 22, 2023
INVENTOR(S) : Trojer et al.

It is certified that error appears in the above-identified patent and that said Letters Patent is hereby corrected as shown below:

On the Title Page

In Item (56), under "OTHER PUBLICATIONS", in Column 2, Line 3, delete "Telecomunicac,O~ Es E" and insert -- Telecomunicações E --, therefor.

In the Specification

In Column 1, Line 10, delete "2020 (status pending)," and insert -- 2020, now Pat. No. 11,382,173, --, therefor.

Signed and Sealed this
Twelfth Day of December, 2023

Katherine Kelly Vidal
*Director of the United States Patent and Trademark Office*